United States Patent
Dinerstein

(10) Patent No.: US 8,719,018 B2
(45) Date of Patent: May 6, 2014

(54) BIOMETRIC SPEAKER IDENTIFICATION

(75) Inventor: Jonathan J. Dinerstein, Draper, UT (US)

(73) Assignee: Lockheed Martin Corporation, Bethesda, MD (US)

( * ) Notice: Subject to any disclaimer, the term of this patent is extended or adjusted under 35 U.S.C. 154(b) by 754 days.

(21) Appl. No.: 12/911,140

(22) Filed: Oct. 25, 2010

(65) Prior Publication Data

US 2012/0101822 A1  Apr. 26, 2012

(51) Int. Cl.
*G10L 17/04* (2013.01)

(52) U.S. Cl.
USPC .......................................... 704/246

(58) Field of Classification Search
USPC .......................................... 704/246
See application file for complete search history.

(56) References Cited

U.S. PATENT DOCUMENTS

| | | | |
|---|---|---|---|
| 5,778,342 A * | 7/1998 | Erell et al. ................. | 704/256.8 |
| 6,107,935 A | 8/2000 | Comerford et al. | |
| 6,134,541 A * | 10/2000 | Castelli et al. ........................ | 1/1 |
| 6,567,776 B1 | 5/2003 | Chang et al. | |
| 6,618,702 B1 | 9/2003 | Kohler et al. | |
| 6,876,987 B2 | 4/2005 | Bahler et al. | |
| 6,941,003 B2 | 9/2005 | Ziesig | |
| 7,225,338 B2 | 5/2007 | Khan et al. | |
| 7,295,970 B1 | 11/2007 | Gorin et al. | |
| 7,404,087 B2 | 7/2008 | Teunen | |
| 7,415,456 B2 | 8/2008 | Benco et al. | |
| 7,487,089 B2 * | 2/2009 | Mozer ........................... | 704/246 |
| 7,720,012 B1 | 5/2010 | Borah et al. | |
| 8,537,978 B2 * | 9/2013 | Jaiswal et al. ............. | 379/88.02 |
| 2004/0213437 A1 | 10/2004 | Howard et al. | |
| 2005/0187916 A1 * | 8/2005 | Levin et al. ....................... | 707/3 |
| 2007/0100622 A1 * | 5/2007 | Tavares ......................... | 704/250 |
| 2007/0172114 A1 | 7/2007 | Baker et al. | |
| 2007/0253608 A1 | 11/2007 | Tulyakov et al. | |
| 2008/0091425 A1 | 4/2008 | Kane | |
| 2008/0095413 A1 * | 4/2008 | Yau et al. ....................... | 382/125 |
| 2008/0126426 A1 * | 5/2008 | Manas et al. ............... | 707/104.1 |
| 2008/0167871 A1 | 7/2008 | Kim et al. | |
| 2008/0172729 A1 | 7/2008 | Takamizawa et al. | |
| 2008/0195387 A1 | 8/2008 | Zigel et al. | |
| 2008/0215323 A1 | 9/2008 | Shaffer et al. | |
| 2008/0306738 A1 | 12/2008 | Lee et al. | |
| 2009/0006093 A1 * | 1/2009 | Das .............................. | 704/246 |
| 2009/0030864 A1 * | 1/2009 | Pednault et al. ................. | 706/45 |
| 2009/0119096 A1 | 5/2009 | Gerl et al. | |
| 2009/0174526 A1 | 7/2009 | Howard et al. | |

(Continued)

OTHER PUBLICATIONS

Apsingekar et al. "Efficient Speaker Identification Using Speaker Model Clustering" 2008.*

(Continued)

*Primary Examiner* — Susan McFadden
(74) *Attorney, Agent, or Firm* — Oblon, Spivak, McClelland, Maier & Neustadt, L.L.P.

(57) ABSTRACT

A biometric speaker-identification apparatus is disclosed that generates ordered speaker-identity candidates for a probe based on prototypes. Probe match scores are clustered, and templates that correspond to clusters having top M probe match scores are compared with the prototypes to obtain template-prototype match scores. The probe is also compared with the prototypes, and those templates corresponding to template-prototype match scores that are nearest to probe-prototype match scores are selected as speaker-identity candidates. The speaker-identity candidates are ordered based on their similarity to the probe.

16 Claims, 7 Drawing Sheets

(56) References Cited

U.S. PATENT DOCUMENTS

| | | | |
|---|---|---|---|
| 2010/0027852 A1 | 2/2010 | Hsieh et al. | |
| 2010/0039223 A1 | 2/2010 | Siedlarz | |
| 2010/0114573 A1 | 5/2010 | Huang et al. | |
| 2010/0128936 A1* | 5/2010 | Baughman | 382/116 |
| 2010/0161654 A1 | 6/2010 | Levy | |
| 2010/0312726 A1* | 12/2010 | Thompson et al. | 706/12 |
| 2011/0135166 A1* | 6/2011 | Wechsler et al. | 382/118 |
| 2011/0282828 A1* | 11/2011 | Precup et al. | 706/54 |

OTHER PUBLICATIONS

Davidson et al. "Speeding up k-means Clustering by Bootstrap Averaging" 2003.*

Ravulakollu et al. "Efficient Speaker Verification System Using Speaker Model Clustering for T and Z Normalizations" 2008.*

Apsingekar et al. "Speaker Model Clustering for Efficient Speaker Identification in Large Population Applications" May 2009.*

Kinnunen et al. "Real-Time Speaker Identification and Verification" 2006.*

De Leon et al. "Reducing Speaker Model Search Space in Speaker Identification" 2007.*

Jun. 20, 2012 Office Action issued in U.S. Appl. No. 12/889,943.

Feb. 16, 2012 Office Action issued in U.S. Appl. No. 12/889,943.

Jul. 16, 2012 Notice of Allowance issued in U.S. Appl. No. 12/889,943.

Gyaourova et al., "A Coding Scheme for Indexing Multimodal Biometric Databases," The Institute of Electrical and Electronics Engineers, Inc., 2009.

Gyaourova et al., "A Novel Coding Scheme for Indexing Fingerprint Patterns," Proceedings of S+SSPR Workshop, Orlando, FL (USA), Dec. 2008, pp. 765-774.

Mhatre et al., "Efficient Search and Retrieval in Biometric Databases," Center for Unified Biometrics and Sensors, University at Buffalo, NY, Mar. 2005.

Mhatre et al., "Indexing Biometric Databases using Pyramid Technique," Center for Unified Biometrics and Sensors, University at Buffalo, NY, 2005.

Qiu et al., "Coarse Iris Classification by Learned Visual Dictionary," Center for Biometrics and Security Research, National Laboratory of Pattern Recognition, Institute of Automation, Chinese Academy of Sciences, P.R. China, 2007.

Yu et al., "Coarse iris classification using box-counting to estimate fractal dimensions," The Journal of the Pattern Recognition Society, Pattern Recognition 38 (2005), pp. 1791-1798.

* cited by examiner

US 8,719,018 B2

BIOMETRIC SPEAKER IDENTIFICATION

BACKGROUND

Speaker-identification is often desired to identify a person based only on voice information. This ability is performed regularly among human beings such as recognizing who is talking over the telephone, for example. However, automated speaker identification has had only limited success.

SUMMARY

A biometric speaker-identification apparatus is disclosed that generates one or more speaker-identity candidates for a probe based on P prototypes. The probe is first compared to templates in a biometric corpus using a voice matching operation to obtain probe match scores. Probe match scores may also be obtained from an external source. The probe match scores are processed to eliminate templates of the biometric corpus that are unlikely to be speaker-identity candidates for the probe.

The biometric speaker-identification apparatus eliminates templates by clustering the probe match scores using a k-means clustering process, for example, and selecting templates that correspond to clusters having top M probe match scores. Then, biometric speaker-identification apparatus 102 eliminates additional templates by selecting only templates that are closest to the probe based on a nearness measurement.

Different kinds of nearness measurement may be used. The preferred nearness measurement is a Euclidian distance in a P dimensional hyperspace spanned by the prototypes. The biometric speaker-identification apparatus performs the voice matching operation between the probe and the prototypes to obtain probe-prototype match scores and between the templates selected in the clustering process and the prototypes to obtain template-prototype match scores. The template-prototype match scores and the probe-prototype match scores are coordinates that define corresponding points in the P dimensional hyperspace. The biometric speaker-identification apparatus selects as the speaker-identity candidates templates that have template-prototype match scores that are less than a distance of a radius R from the probe-prototype match scores.

The speaker-identity candidates selected above are ordered based on a similarity between the speaker-identity candidates and the probe. Although different similarity measurements may be used, a preferred similarity measurement is a dot product.

The biometric speaker-identification apparatus performs the voice matching operation between the speaker-identity candidates and the templates in the biometric corpus to obtain speaker-identity-candidate match scores. Then, the biometric speaker-identification apparatus performs the dot product between the speaker-identity-candidate match scores and the probe match scores, and orders the speaker-identity candidates based on results of the dot product.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
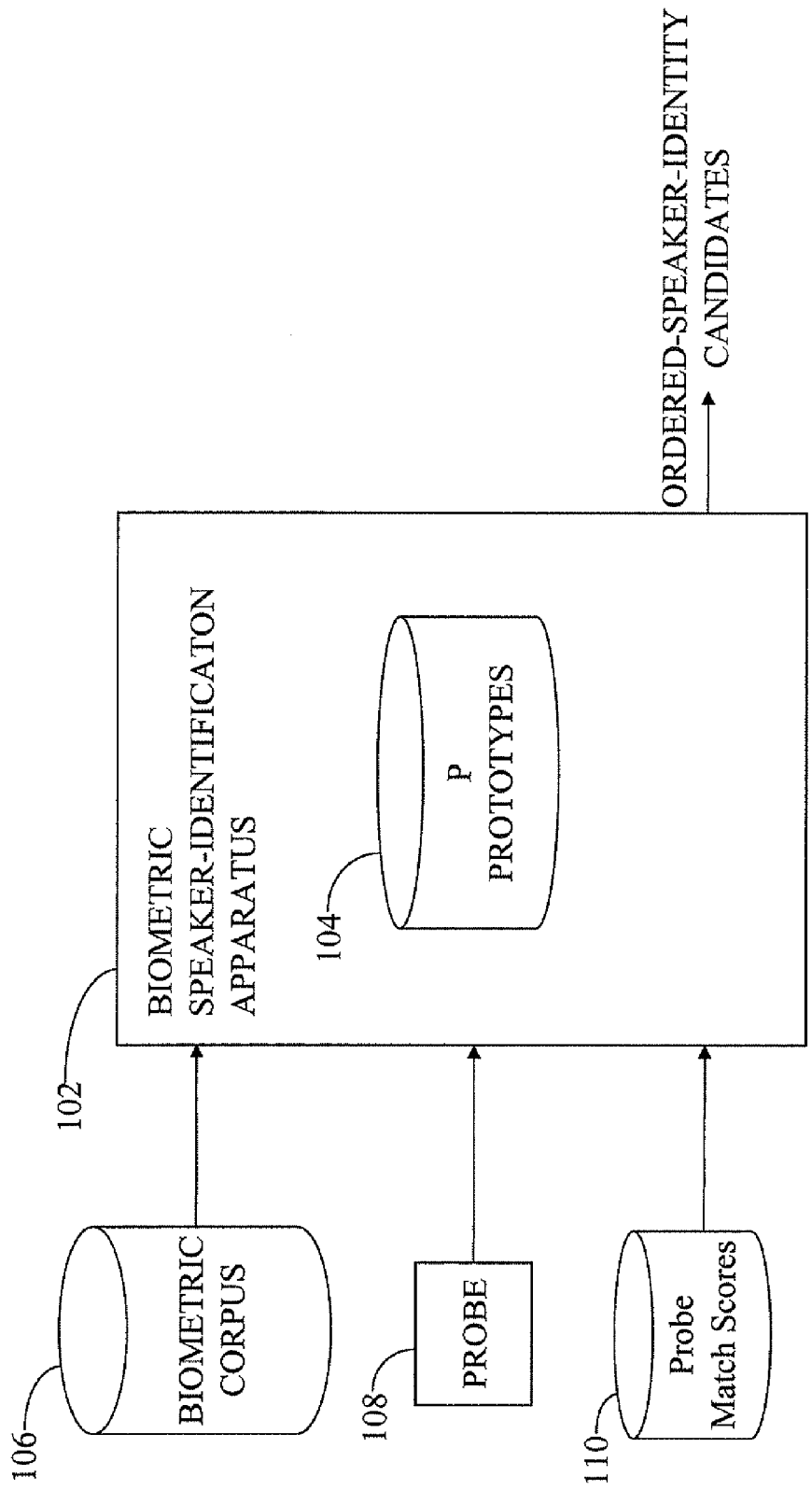
FIG. 1 illustrates a biometric speaker-identification apparatus.

FIG. 1 shows a biometric speaker-identification apparatus 102 that is coupled to a biometric corpus 106 and generates one or more speaker-identity candidates for probe 108 based on P prototypes 104. Probe match scores 110 may be obtained from an external source or generated by performing a voice matching operation between probe 108 and templates in biometric corpus 106. Biometric speaker-identification apparatus 102 processes probe match scores 110 to eliminate templates of biometric corpus 106 that are highly unlikely to match probe 108 and orders remaining templates according to their similarity to probe 108.

Eliminating templates occurs in two steps. First, biometric speaker-identification apparatus 102 clusters probe match scores 110 using a clustering process such as k-means clustering to obtain k clusters of probe match scores 110. Templates of biometric corpus 106 corresponding to clusters having top M probe match scores are selected. M may be determined by experience.

Biometric speaker-identification apparatus 102 performs the voice matching operation between probe 108 and prototypes 104 to obtain probe-prototype match scores, and between the templates selected in the clustering process and prototypes 104 to obtain template-prototype match scores. Biometric speaker-identification apparatus 102 selects speaker-identity candidates that are templates whose template-prototype match scores are closest to the probe-prototype match scores based on a nearness measurement.

Different kinds of nearness measurement may be used. The preferred nearness measurement is based on a Euclidian distance. Biometric speaker-identification apparatus 102 selects as the speaker-identity candidates templates that have template-prototype match scores that are less than distance of a radius R from the probe-prototype match scores.

Biometric speaker-identification apparatus 102 orders the speaker-identity candidates based on a similarity between the speaker-identity candidates and probe 108. Similar to the nearness measurement, different similarity measurements may be used. A preferred similarity measurement is a dot product.

Biometric speaker-identification apparatus 102 performs the voice matching operation between the speaker-identity candidates and templates in biometric corpus 102 to obtain speaker-identity-candidate match scores. Then, biometric speaker-identification apparatus 102 performs the dot product between the speaker-identity-candidate match scores and probe match scores 110, and orders the speaker-identity candidates based on results of the dot product.

Figure 2:
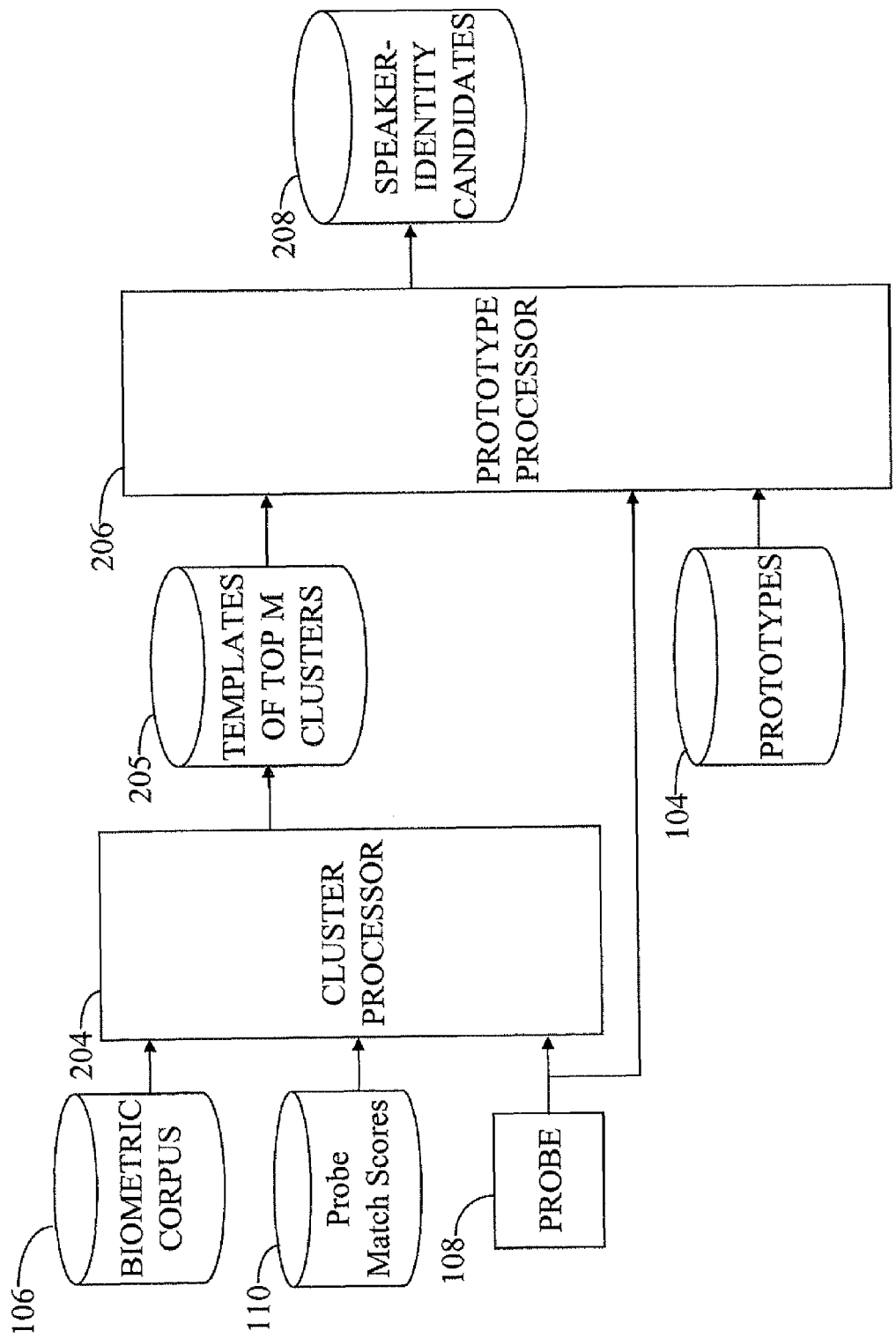
FIG. 2 illustrates cluster and prototype processors.

FIG. 2 shows a cluster processor 204 that is coupled to biometric corpus 106, probe 108 and probe match scores 110, and selects templates 205 of top M clusters (i.e., templates of clusters having top M probe match scores). Cluster processor 204 may use any number of clustering algorithms, some of which may be found in Wikipedia at http://en.wikipedia.org/wiki/Data_clustering#Types_of_clustering. In a preferred embodiment, k-means clustering is used.

There are various ways to implement k-means clustering. One way is to randomly select k clusters. Centers of the k clusters are determined by calculating an average or mean of all the probe match scores in each of the k clusters. Then, every probe match score 110 is assigned to a nearest center based on a distance measurement such as a difference between a probe match score to be assigned and the center probe match score. After all probe match scores 110 have been assigned, centers of the resulting k clusters are then calculated by averaging all the probe match scores in each cluster and the clustering process is performed again. The above process is repeated until positions of centers do not change. "Change" may be defined as a difference between a new center and a previous center for a cluster that is less than a threshold.

Cluster processor 204 starts with k=1 (probe match scores 110=the original cluster) which basically finds a center or mean of probe match scores 110, increments k by 1, performs the clustering process to determine new centers, and increments k by 1 again and so on until a probe match score deviation within the clusters is about 10 times less than the probe match score deviation in the original cluster. Probe match score deviation may be the difference between a largest probe match score and the smallest probe match score within a cluster. Templates 205 corresponding to top M clusters are selected for further processing by prototype processor 206. The remaining templates are discarded because these templates are unlikely to be selected as a speaker-identity candidate for probe 108.

Prototype processor 206 performs the voice matching operation between probe 108 and prototypes 104 to obtain probe-prototype match scores, and between templates 205 and prototypes 104 to obtain template-prototype match scores. Prototypes 104 may be randomly selected templates from biometric corpus 106 or from other sources and are preferred to represent all the templates in biometric corpus 106. Template-prototype match scores and probe-prototype match scores are used to measure a nearness of each of templates 205 to probe 108.

Prototype processor 206 measures the nearness between templates 205 and probe 108 by using P prototypes 104 as axes to span a P dimensional hyperspace. The template-prototype match scores and the probe-prototype match scores are used as coordinates for corresponding points in the hyperspace. Euclidian distance may be used as a distance measurement. Thus, a hyper-sphere may be defined by a radius R that serves as a threshold distance so that templates that are located within the hyper-sphere are selected as speaker-identity candidates 208. Those templates that are outside the hyper-sphere are rejected as unlikely to be speaker-identity candidates 208. R may be determined by experience.

Figure 3:
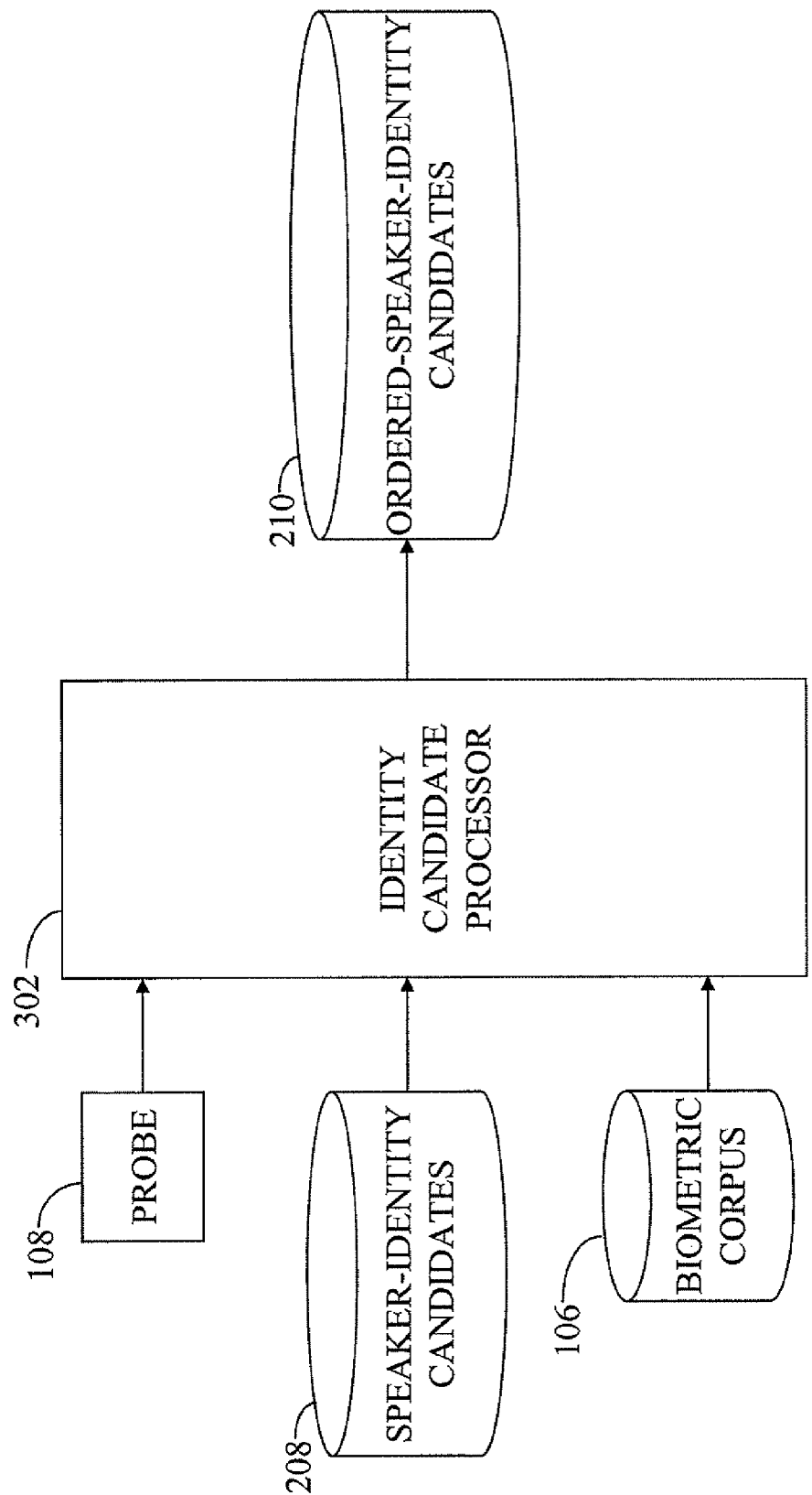
FIG. 3 illustrates an identity candidate processor.

FIG. 3 shows identity processor 302 that orders speaker-identity candidates 208 based on a similarity between speaker-identity candidates 208 and probe 108. Identity processor 302 first performs the voice matching operation between speaker-identity candidates 208 and all the templates in biometric corpus 106 to obtain speaker-identity-candidate match scores. Then, a nearness measurement is made between the speaker-identity-candidate match scores and probe match scores 110 for all the speaker-identity candidates.

There are various methods to make the nearness measurement. For example, absolute values of differences between the template match scores and probe match scores 110 for corresponding templates in biometric corpus 106 may be summed, and the lowest sum indicates that a corresponding speaker-identity candidate is nearest to probe 108. Other nearness measurement may be based on Euclidian distance, for example. A preferred nearness measurement is a dot product between the template match scores and probe match scores 110. The dot product for an $i^{th}$ speaker-identity candidate is defined as:

$$DOT_i = SUM(tms_{it} * pms_t),$$

for all T templates in biometric corpus 106, where $tms_{it}$ is the template match score between the $i^{th}$ speaker-identity candidate and a $t^{th}$ template, $pms_t$ is the probe match score for the $t^{th}$ template, and the sum is taken over all T templates in biometric corpus 106.

Identity processor 302 performs the dot product between each speaker-identity candidate 208 and probe 108. Then, speaker-identity candidates 208 are sorted based on results of the dot product to generate ordered speaker-identity candidates 210. Ordered-speaker-identity candidates 210 are then output for human consideration. In a practical situation, M and R should be set to result in a small number of ordered speaker-identity candidates 210 so that effective human evaluation may be performed to uniquely identify a speaker.

Figure 4:
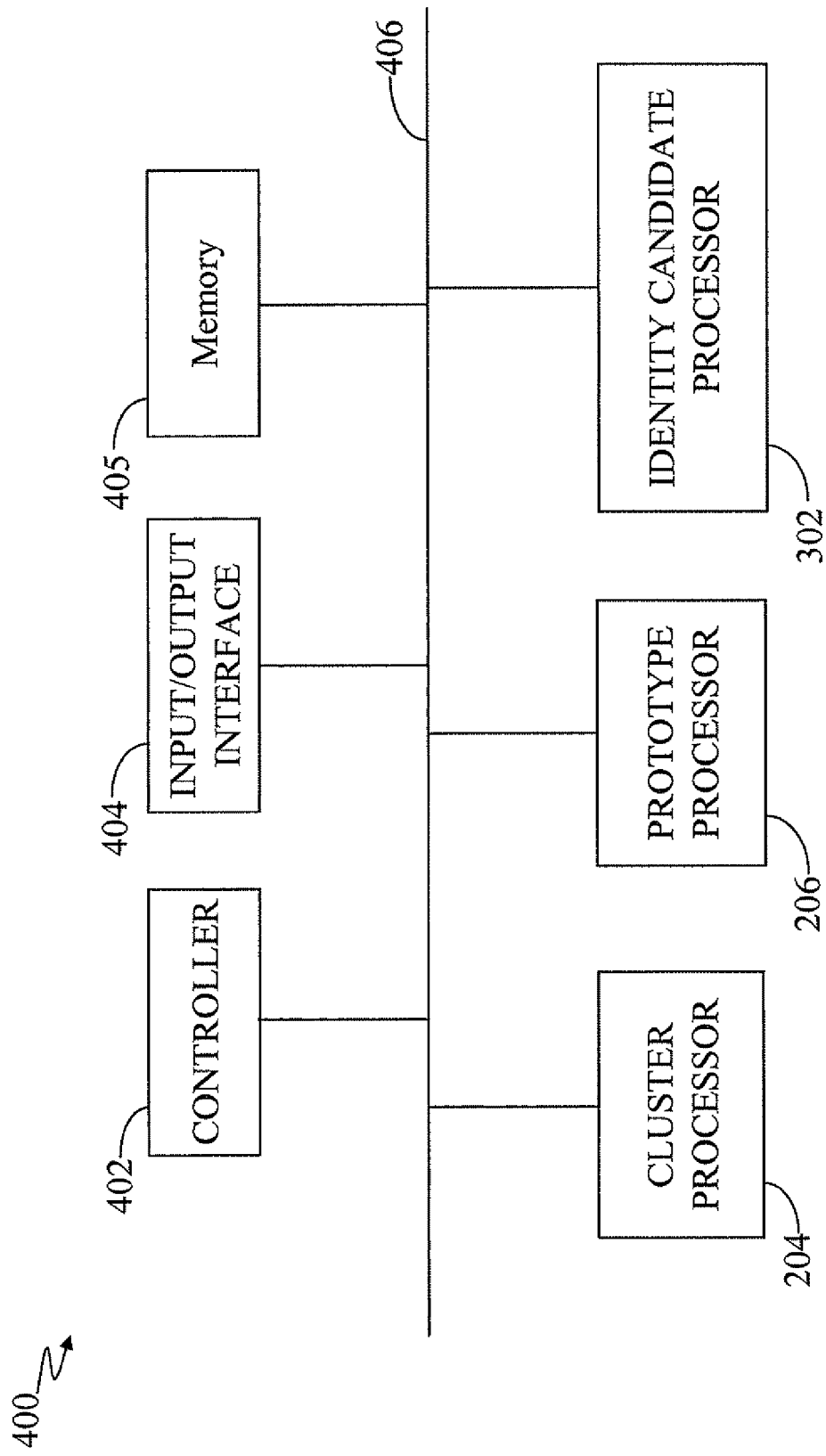
FIG. 4 illustrates an exemplary block diagram of the biometric speaker-identification apparatus.

FIG. 4 shows an exemplary block diagram of a biometric speaker-identification processor 400 that includes a controller 402, an input/output interface 404, a memory 405 that stores prototypes 104, probe match scores 110, speaker-identity candidates 208, etc. for use by other components, cluster processor 204, prototype processor 206, and identity candidate processor 302. Components 402, 404, 405, 204, 206 and 302 are coupled together by signal bus 406. Although shown in bus architecture for convenience of illustration, other hardware architectures may be used depending on specific circumstances. Also, while controller 402, cluster processor 204, prototype processor 206 and identity candidate processor 302 are identified separately for clarity of illustration, a single processor may perform the functions of all these components. Further, these components may be implemented by various hardware technologies such as PLI, PAL, application specific integrated circuits (ASICs), etc. Memory 405 may be RAM, disk storage, or other types of memory technology. Although shown as one single block for convenience, memory 405 may be distributed among other components as implementation may require.

Controller 402 performs general housekeeping tasks such as interfacing with users through input/output interface 404 to receive probe match scores 110 and prototypes 104 and store them in memory 405 when these are provided by external sources. Controller 402 may generate probe match scores 110 and/or select prototypes 104 and store them in memory 405 if specified by a user. Cluster processor 204 receives probe match scores 110 through signals bus 406, either from controller 402 or from an external source through input/output interface 404, performs the iterative clustering process discussed above, and selects template of top M clusters for processing by prototype processor 206.

Prototype processor 206 receives the selected templates and prototypes 104 through signal bus 406. Prototype processor 206 performs the voice matching operation between probe 108 and prototypes 104 to generate probe-prototype match scores, and between the templates selected in the clustering process and prototypes 104 to generate template-prototype match scores. Then, prototype processor 206 creates a P dimensional hyperspace spanned by prototypes 104, maps template-prototype match scores and probe-prototype match scores as points in the hyperspace, and selects as speaker-identity candidates 208 templates corresponding to points that are within a hyper-sphere having a radius R centered around a point corresponding to probe 108. Thus, prototype processor 206 selects templates that are within a Euclidian distance R of probe 108. Speaker identity candidates 208 are sent to identity candidate processor 302 through signal bus 406.

Identity candidate processor 302 performs the voice matching operation between each of speaker-identity candidates 208 and the templates in biometric corpus 106 to obtain speaker-identity candidate match scores. Then, identity candidate processor 302 performs the dot product discussed above between the speaker-identity-candidate match scores of each of speaker-identity candidates 208 and probe match scores 110 to obtain a similarity value. Identity candidate processor 302 orders speaker-identity candidates 208 according to their similarity values to form ordered-speaker-identity candidates 210.

Figure 5:
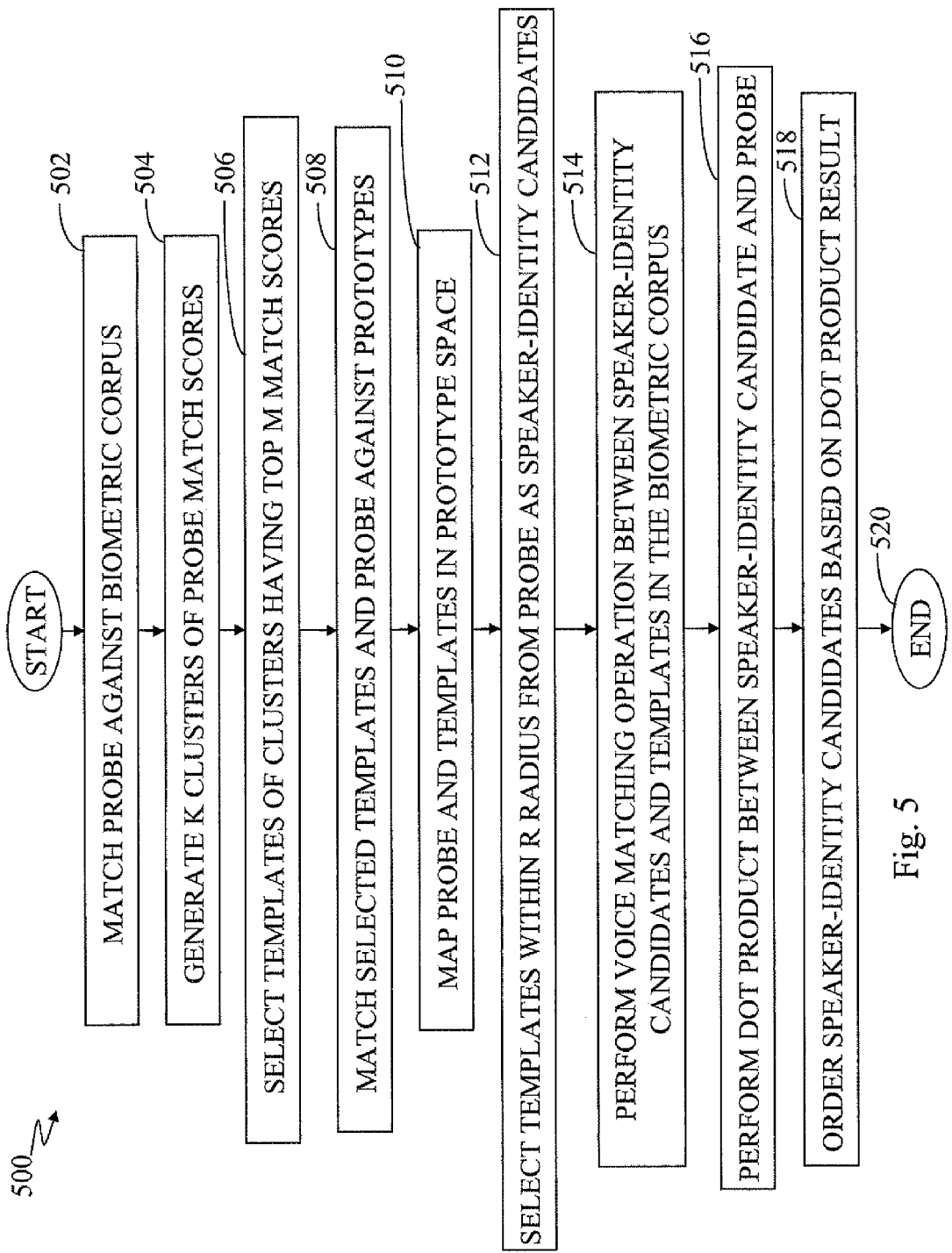
FIG. 5 illustrates an exemplary flowchart of a process of the biometric speaker-identification apparatus.

FIG. 5 shows an exemplary flowchart 500 of a process performed by biometric speaker identity processor 400. In step 502, the process performs the voice matching operation between probe 108 and the templates in biometric corpus 106 to obtain probe match scores 110, and goes to step 504. As noted above, probe match scores 110 may be provided from an external source in which case, step 502 receives probe match scores 110 from the external source. In step 504, the process performs k-means clustering to generate k clusters of probe match scores 110 where a deviation of probe match scores 110 within each of the k clusters is less than about 10 times a deviation of probe match scores 110 prior to clustering, and goes to step 506. In step 506, the process selects templates corresponding to the top M clusters, and goes to step 508.

In step 508, the process performs the voice matching operation between the templates selected in step 506 and prototypes 104 to generate template-prototype match scores, and between probe 108 and prototypes 104 to generate probe-prototype match scores, and goes to step 510. In step 510, the process maps probe 108 and the selected templates from step 506 into a P dimensional hyperspace spanned by prototypes 104, and goes to step 512. In step 512, the process selects templates as speaker-identity candidates 208 in the hyperspace that are within a hyper-sphere of R radius around probe 108, and goes to step 514.

In step 514, the process performs the voice matching operation between speaker-identity candidates 208 and the templates in biometric corpus 106 to generate speaker-identity-candidate match scores, and goes to step 516. In step 516, the process performs the dot product operation between the speaker-identity-candidate match scores and the probe match scores 110 to generate similarity values for the speaker-identity candidates 208, and goes to step 518. In step 518, the process orders speaker-identity candidates 208 according to corresponding similarity values, outputs ordered-speaker-identity candidates 210, goes to step 520 and ends.

Figure 6:
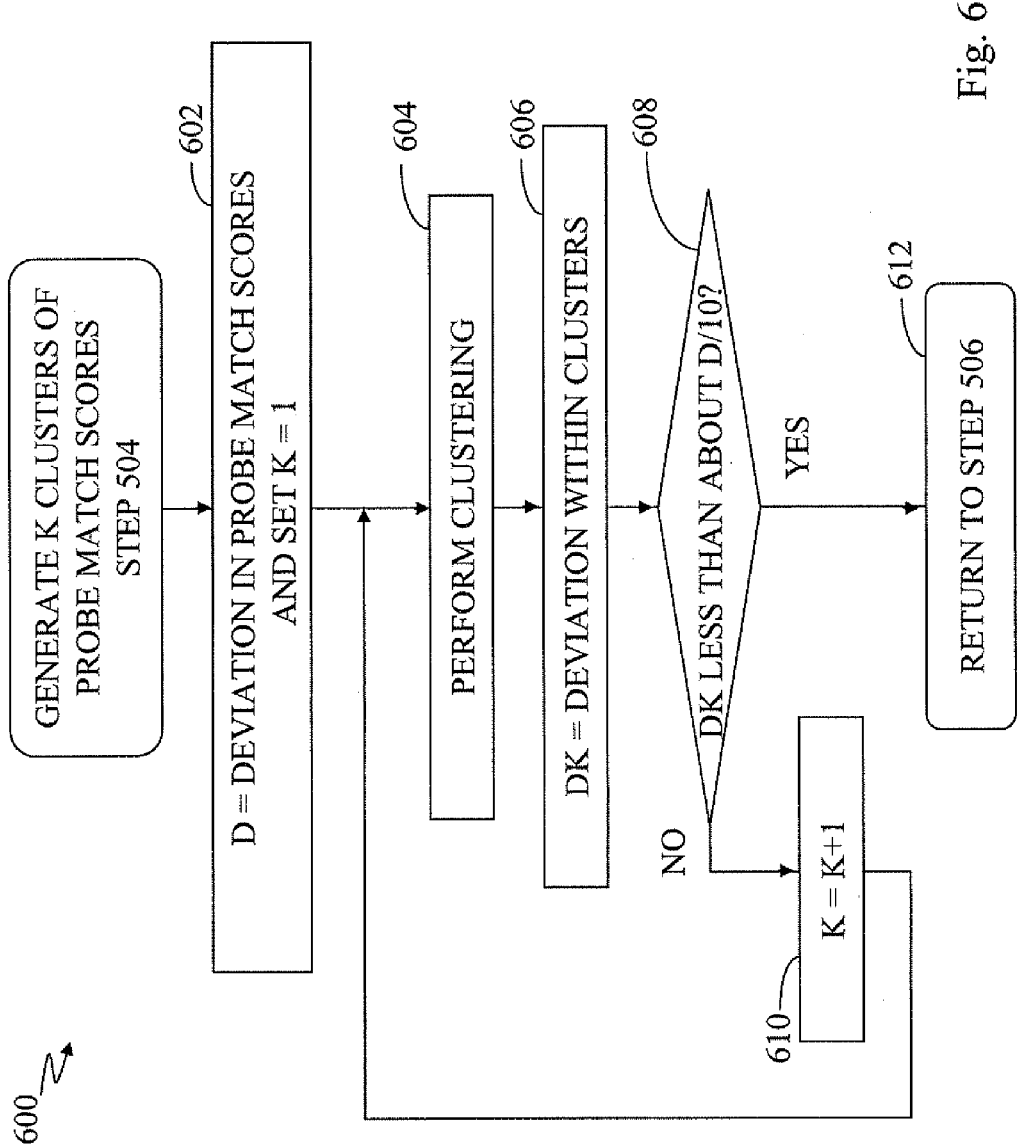
FIG. 6 illustrates an exemplary flowchart of generating k clusters.

FIG. 6 shows and exemplary flowchart 600 of the k-means clustering process performed by biometric speaker-identification processor 400. In step 602, the process calculates a deviation D of probe match scores 110, sets K=1, and goes to step 604. As discussed above, a deviation may be a difference between a largest probe match score and a smallest probe match score. In step 604, the process performs the clustering process discussed above and shown in detail below in FIG. 7, and goes to step 606. In step 606, the process determines a largest deviation of probe match scores within the clusters (DK), and goes to step 608. In step 608, the process determines whether DK is less than about one tenth of D. If DK is less than about one tenth of D, the process goes to step 612 which returns to step 506 of flowchart 500. Otherwise, if DK is not less than about one tenth of D, the process goes to step 610. In step 610, the process increments K by 1, and returns to step 604.

Figure 7:
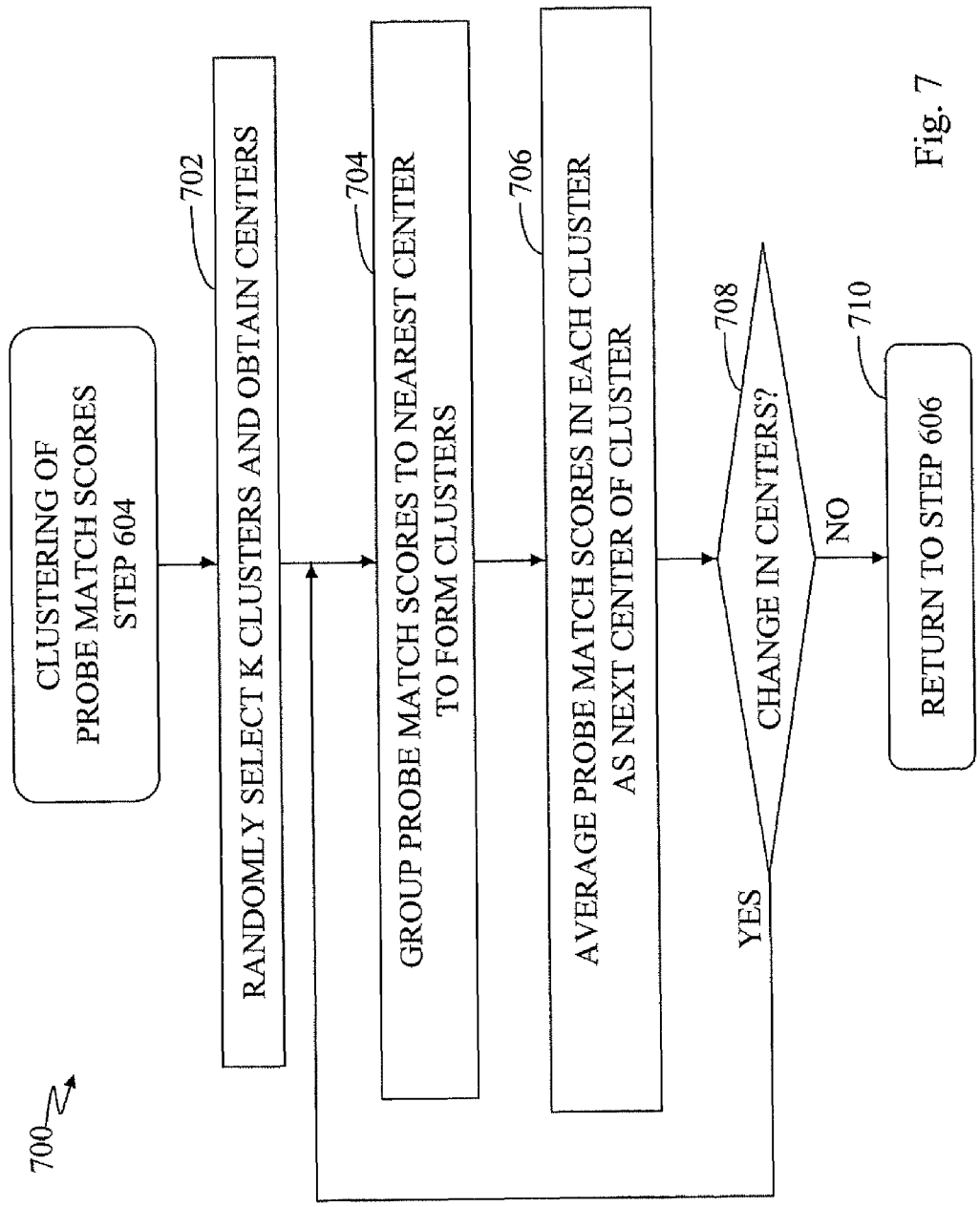
FIG. 7 illustrates an exemplary flowchart of a clustering process.

FIG. 7 shows a flowchart 700 of step 604 of flowchart 600 in greater detail. In step 702, the process randomly selects K clusters of probe match scores 110, averages probe match scores within each of the clusters to obtain a mean as a center, and goes to step 704. In step 704, the process groups probe match scores 110 to a nearest center to form clusters, and goes to step 706. In step 706, the process averages all the probe match scores in each of the K clusters to form new centers for the clusters, and goes to step 708.

In step 708, the process determines whether there is a difference between the new centers and the old centers, i.e., whether there is a change in the centers. A change may be defined as a difference that exceeds a threshold. If there is a change in the centers, the process returns to step 704. Otherwise, all changes in the centers are less than the threshold, the process goes to step 710 and returns to step 606 of flowchart 600.

Although the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A biometric speaker-identification apparatus that generates one or more speaker-identity candidates for a speaker based on probe match scores obtained by performing a voice matching operation between a probe and templates in a biometric corpus, comprising:
a plurality of prototypes; and
a speaker-identification processor coupled to the biometric corpus, the speaker-identification processor configured to select templates of the biometric corpus as the speaker-identity candidates based on the prototypes,
wherein the speaker-identification processor is further configured to:
perform the voice matching operation between the speaker-identity candidates and the templates in the biometric corpus to obtain one or more speaker-identity-candidate match scores;
perform a similarity measurement between the speaker-identity-candidate match scores and the probe match scores to obtain one or more similarity values; and
order the speaker-identity candidates based on the similarity values, and
wherein the similarity measurement for an $i^{th}$ speaker-identity candidate is a dot product defined as:

$$DOT_i = SUM(tms_{i,t} * pms_t),$$

where the sum is taken over all the templates in the biometric corpus, $tms_{i,t}$ is a template match score between the $i^{th}$ speaker-identity candidate and a $t^{th}$ template, and $pms_t$ is a probe match score for the $t^{th}$ template.

2. The apparatus of claim 1 wherein the speaker-identification processor is further configured to:
perform the voice matching operation between the probe and the prototypes to obtain probe-prototype match scores;
perform the voice matching operation between first templates selected from the biometric corpus and the prototypes to obtain template-prototype match scores; and select as the speaker-identity candidates one or more second templates corresponding to template-prototype match scores that are nearest to the probe-prototype match scores based on a nearness measurement.

3. The apparatus of claim 2 wherein the speaker-identification processor is further configured to:
cluster the probe match scores until probe match scores in each of K clusters have a deviation less than about ten times a deviation in all the probe match scores; and
select templates that belong to clusters that have probe match scores greater than M as the first templates.

4. The apparatus of claim 2 wherein the speaker-identification processor is further configured to:
cluster the probe match scores into K clusters; and
select templates from the biometric corpus corresponding to ones of the K clusters having probe match scores that exceed M as the first templates.

5. The apparatus of claim 4 wherein the speaker-identification processor is configured to start clustering the probe match scores with K=1 and repeats the clustering with K incremented by 1 until a difference between a maximum probe match score and a minimum probe match score in each of the K clusters is less than about ten times a difference between a maximum probe match score and a minimum probe match score in all the probe match scores.

6. The apparatus of claim 2 wherein the nearness measurement is a Euclidian distance in a P dimensional hyperspace spanned by the prototypes, the template-prototype match scores and the probe-prototype match scores are coordinates of points in the P dimensional hyperspace, and the speaker-identification processor is further configured to select as the speaker-identity candidates templates corresponding to template-prototype match scores that are within an R radius of a probe point corresponding to the probe-prototype match scores.

7. A biometric speaker-identification apparatus that generates a speaker-identity candidate for a speaker based on probe match scores obtained by performing a voice matching operation between a probe and templates in a biometric corpus, comprising:
a plurality of prototypes;
a speaker-identification processor coupled to the biometric corpus, the speaker-identification processor configured to:
group the probe match scores into K clusters;
select templates corresponding to ones of the K clusters having probe match scores that exceed M;
perform the voice matching operation between the selected templates and the prototypes to obtain template-prototype match scores;
perform the voice matching operation between the probe and the prototypes to obtain probe-prototype match scores;
select as speaker-identity candidates one or more templates corresponding to template-prototype match scores that are nearest to the probe-prototype match scores based on a nearness measurement
perform the voice matching operation between the speaker-identity candidates and the templates in the biometric corpus to obtain one or more speaker-identity-candidate match scores;
perform a similarity measurement between the speaker-identity-candidate match scores and the probe match scores to obtain one or more similarity values; and
order the speaker-identity candidates based on the similarity values,
wherein the similarity measurement for an $i^{th}$ speaker-identity candidate is a dot product defined as:

$$DOT_i = SUM(tms_{it} * pms_t),$$

where the sum is taken over all the templates in the biometric corpus, $tms_{it}$ is a template match score between the $i^{th}$ speaker-identity candidate and a $t^{th}$ template, and $pms_t$ is a probe match score for the $t^{th}$ template.

8. The apparatus of claim 7 wherein the speaker-identification processor is further configured to:
perform the voice matching operation between the speaker-identity candidates and the templates in the biometric corpus to obtain speaker-identity-candidate match scores;
perform a similarity measurement between the speaker-identity-candidate match scores and the probe match scores to obtain similarity values; and
order the speaker-identity candidates based on the similarity values.

9. A biometric speaker-identification method performed by processing circuitry, the method comprising:
storing a plurality of prototypes in a memory;
selecting templates of a biometric corpus as one or more speaker-identity candidates for a probe based on the prototypes;
performing a voice matching operation between the speaker-identity candidates and the templates in the biometric corpus to obtain speaker-identity-candidate match scores;
performing a similarity measurement between the speaker-identity-candidate match scores and probe match scores to obtain similarity values; and
ordering the speaker-identity candidates based on the similarity values,
wherein the similarity measurement for an $i^{th}$ speaker-identity candidate is a dot product defined as:

$$DOT_i = SUM(tms_{it} * pms_t),$$

where the sum is taken over all the templates in the biometric corpus, $tms_{it}$ is a template match score between the $i^{th}$ speaker-identity candidate and a $t^{th}$ template, and $pms_t$ is a probe match score for the $t^{th}$ template.

10. The method of claim 9 further comprising:
performing the voice matching operation between the probe and the prototypes to obtain probe-prototype match scores;
selecting first templates from the biometric corpus;
performing the voice matching operation between the first templates and the prototypes to obtain template-prototype match scores; and
selecting as the speaker-identity candidates one or more second templates corresponding to template-prototype match scores that are nearest to the probe-prototype match scores based on a nearness measurement.

11. The method of claim 10 furthering comprising:
clustering the probe match scores until probe match scores in each of K clusters have a deviation less than about ten times a deviation in the probe match scores; and
selecting templates that belong to clusters that have probe match scores greater than M as the first templates.

12. The method of claim 10 further comprising:
storing, in the memory, probe match scores obtained by performing a voice matching operation between the probe and the templates of the biometric corpus;
clustering the probe match scores into K clusters; and selecting templates corresponding to ones of the K clusters having probe match scores that exceed M as the first templates.

13. The method of claim 12 wherein the clustering comprises:
setting K=1;
performing a clustering process; and
repeating the clustering process with K incremented by 1 each time until in each of the K clusters a difference between a maximum probe match score and a minimum probe match score is less than about ten times a difference between a maximum probe match score and a minimum probe match score in all the probe match scores.

14. The method of claim 11 wherein the nearness measurement is a Euclidian distance, the method further comprising:
spanning a P dimensional hyperspace having the prototypes as axes; and
selecting as the speaker-identity candidates templates corresponding to template-prototype match scores that are within an R radius of a probe point corresponding to the probe-prototype match scores, wherein template-prototype match scores and probe-prototype match scores are coordinates of points in the P dimensional hyperspace.

15. The method of claim 9 further comprising:
grouping probe match scores into K clusters;
selecting templates corresponding to ones of the K clusters having probe match scores that exceed M;
performing the voice matching operation between the selected templates and the prototypes to obtain template-prototype match scores;
performing the voice matching operation between the probe and the prototypes to obtain probe-prototype match scores; and
selecting as the speaker-identity candidates templates corresponding to template-prototype match scores that are nearest to the probe-prototype match scores based on a Euclidian distance measurement in a P dimensional space spanned by the prototypes.

16. The method of claim 15 further comprising:
performing the voice matching operation between the speaker-identity candidates and the templates in the biometric corpus to obtain speaker-identity-candidate match scores;
performing a dot product between the speaker-identity-candidate match scores and the probe match scores to obtain similarity values; and
ordering the speaker-identity candidates based on the similarity values.

\* \* \* \* \*